(12) United States Patent
Galloway

(10) Patent No.: US 10,355,602 B2
(45) Date of Patent: Jul. 16, 2019

(54) FAULT SUPPRESSION OR RECOVERY FOR ISOLATED CONVERSION

(71) Applicant: Analog Devices Global, Hamilton (BM)

(72) Inventor: Gavin Galloway, Glasgow (GB)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/408,948

(22) Filed: Jan. 18, 2017

(65) Prior Publication Data

US 2018/0205320 A1    Jul. 19, 2018

(51) Int. Cl.
| | |
|---|---|
| *H02M 3/335* | (2006.01) |
| *H02M 1/08* | (2006.01) |
| *H02M 1/32* | (2007.01) |
| *H02M 1/36* | (2007.01) |
| *H02M 1/00* | (2006.01) |

(52) U.S. Cl.
CPC ......... *H02M 3/33523* (2013.01); *H02M 1/08* (2013.01); *H02M 1/32* (2013.01); *H02M 1/36* (2013.01); *H02M 3/335* (2013.01); *H02M 3/33507* (2013.01); *H02M 2001/0009* (2013.01); *H02M 2001/325* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 1/32; H02M 1/36; H02M 1/08; H02M 2001/0009; H02M 2001/325

USPC .. 363/20, 21.04, 21.05, 21.07, 21.08, 21.09, 363/21.1, 21.11, 21.12, 21.13, 21.15, 363/21.16, 21.17, 21.18

See application file for complete search history.

(56) References Cited

U.S. PATENT DOCUMENTS

| | | |
|---|---|---|
| 5,438,499 A | 8/1995 | Bonte et al. |
| 5,841,643 A | 11/1998 | Schenkel |
| 7,463,497 B2 | 12/2008 | Negrete |
| 8,570,772 B2 | 10/2013 | Morris et al. |

(Continued)

OTHER PUBLICATIONS

Reza Moghimi, Ask the applications engineer-31: Amplifiers as comparators? (Apr. 2003). Retrieved from http://www.analog.com/en/analog-dialogue/articles/amplifiers-as-comparators.html.*

(Continued)

*Primary Examiner* — Bryan R Perez

(74) *Attorney, Agent, or Firm* — Schwegman Lundberg & Woessner, P.A.

(57) ABSTRACT

A flyback power conversion circuit can be operated by selectively establishing and interrupting a current through a first inductance to store energy. A portion of the energy from a second inductance can be transferred to a storage device to provide an output voltage, where the second inductance is magnetically coupled to the first inductance. Information transmitted across an isolation barrier can be monitored, such as information indicative of the output voltage. The monitoring can include detecting whether information from at least two sources is consistent. An operating mode of the flyback power conversion circuit can be selected, such as response to the detecting whether the information from at least two sources is consistent, or whether valid information is being transmitted across the isolation barrier, or in response to one or more other criteria.

20 Claims, 5 Drawing Sheets

(56) References Cited

U.S. PATENT DOCUMENTS

| | | | |
|---|---|---|---|
| 2010/0103705 A1 | 4/2010 | Fang et al. | |
| 2013/0003422 A1* | 1/2013 | Persson | H02M 1/36 363/21.01 |
| 2014/0301117 A1 | 10/2014 | Hirabayashi | |
| 2015/0103567 A1* | 4/2015 | Wang | H02M 3/33592 363/21.13 |
| 2015/0229149 A1 | 8/2015 | Fahlenkamp et al. | |
| 2015/0249389 A1 | 9/2015 | Cummings | |
| 2016/0149504 A1* | 5/2016 | Quigley | H02M 1/36 363/21.04 |
| 2016/0233775 A1 | 8/2016 | Barrenscheen et al. | |
| 2016/0373014 A1 | 12/2016 | Pflaum | |

OTHER PUBLICATIONS

"International Application Serial No. PCT/IB2018/000298, International Search Report dated Jun. 11, 2018", 4 pgs.
"International Application Serial No. PCT/IB2018/000298, Written Opinion dated Jun. 11, 2018", 8 pgs.

* cited by examiner

FAULT SUPPRESSION OR RECOVERY FOR ISOLATED CONVERSION

FIELD OF THE DISCLOSURE

This document pertains generally, but not by way of limitation, to power conversion circuit control, and more particularly to suppression or recovery from an overvoltage condition or other fault.

BACKGROUND

Switched-mode power conversion circuits can offer various performance enhancements as compared to other power supply circuit topologies. For example, switched-mode power conversion circuits are generally more efficient and can be more spatially-compact than a comparably-rated linear or low-dropout (LDO) supply topology. In particular, a DC-to-DC flyback power conversion circuit generally converts an input direct-current (DC) supply voltage to a different output voltage value, and the output voltage value can be greater in magnitude than the supply voltage. Additionally, a flyback power conversion circuit can provide isolation between circuitry associated with an input node and circuitry associated with an output node, such as for applications where such isolation is desired for electrical performance or safety reasons, as illustrative examples. Such isolation can inhibit a conductive pathway between the circuitry associated with the input node and the circuitry associated with the output node.

SUMMARY OF THE DISCLOSURE

A flyback power conversion circuit can be operated by selectively establishing and interrupting a current through a first inductance to store energy. A portion of the energy from a second inductance can be transferred to a storage device to provide an output voltage, where the second inductance is magnetically coupled to the first inductance. Information transmitted across an isolation barrier can be monitored, such as information indicative of the output voltage. The monitoring can include detecting whether information from at least two sources is consistent. An operating mode of the flyback power conversion circuit can be selected, such as response to the detecting whether the information from at least two sources is consistent, or whether valid information is being transmitted across the isolation barrier, or in response to one or more other criteria.

In an example, a flyback power conversion circuit can be configured to provide a regulated output voltage, the flyback power conversion circuit comprising an input voltage node configured to receive a direct current (DC) input voltage, a control circuit, a primary-side switch coupled to the control circuit and configured to selectively establish and interrupt a current through a first inductance in response to a switch control signal provided by the control circuit, and a feedback circuit, the feedback circuit configured to provide information across an isolation barrier to the control circuit using an isolation circuit, the information indicative of an output voltage, the isolation barrier inhibiting conductive coupling between the first inductance and a magnetically-coupled second inductance, the first inductance included as a portion of primary-side circuit, and the second inductance included as a portion of a secondary-side circuit. The output voltage is established at the secondary-side circuit and the control circuit can be configured to detect whether information indicative of output voltage monitored using at least two sources is consistent between the at least two sources, and, in response, to select an operating mode of the flyback power conversion circuit using the control circuit. Such monitoring can include detecting a presence of information transmitted across the isolation barrier or whether such information is valid.

In an example, a technique such as a method for operating a flyback power conversion circuit can include, using a control circuit, selectively establishing and interrupting a current through a first inductance to store energy during a switching cycle. The technique can include transferring a portion of the energy from a second inductance to a storage device to provide an output voltage, the second inductance magnetically coupled to the first inductance, and using the control circuit, monitoring information from at least two sources of information indicative of the output voltage, including monitoring information transmitted across an isolation barrier, the isolation barrier configured to inhibit conductive coupling between the circuits comprising the first and second inductances. An operating mode of the flyback power conversion circuit can be selected using the control circuit such as in response to whether the monitored information is consistent between the at least two sources. In the examples mentioned above, and in examples elsewhere herein, the two sources can include, respectively, a first monitoring circuit configured to indirectly monitor the output voltage, such as using a node located on the primary side of the flyback power conversion circuit, and a second monitoring circuit configured to directly monitoring the output voltage, such as using a node located on the secondary side of the flyback power conversion circuit.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
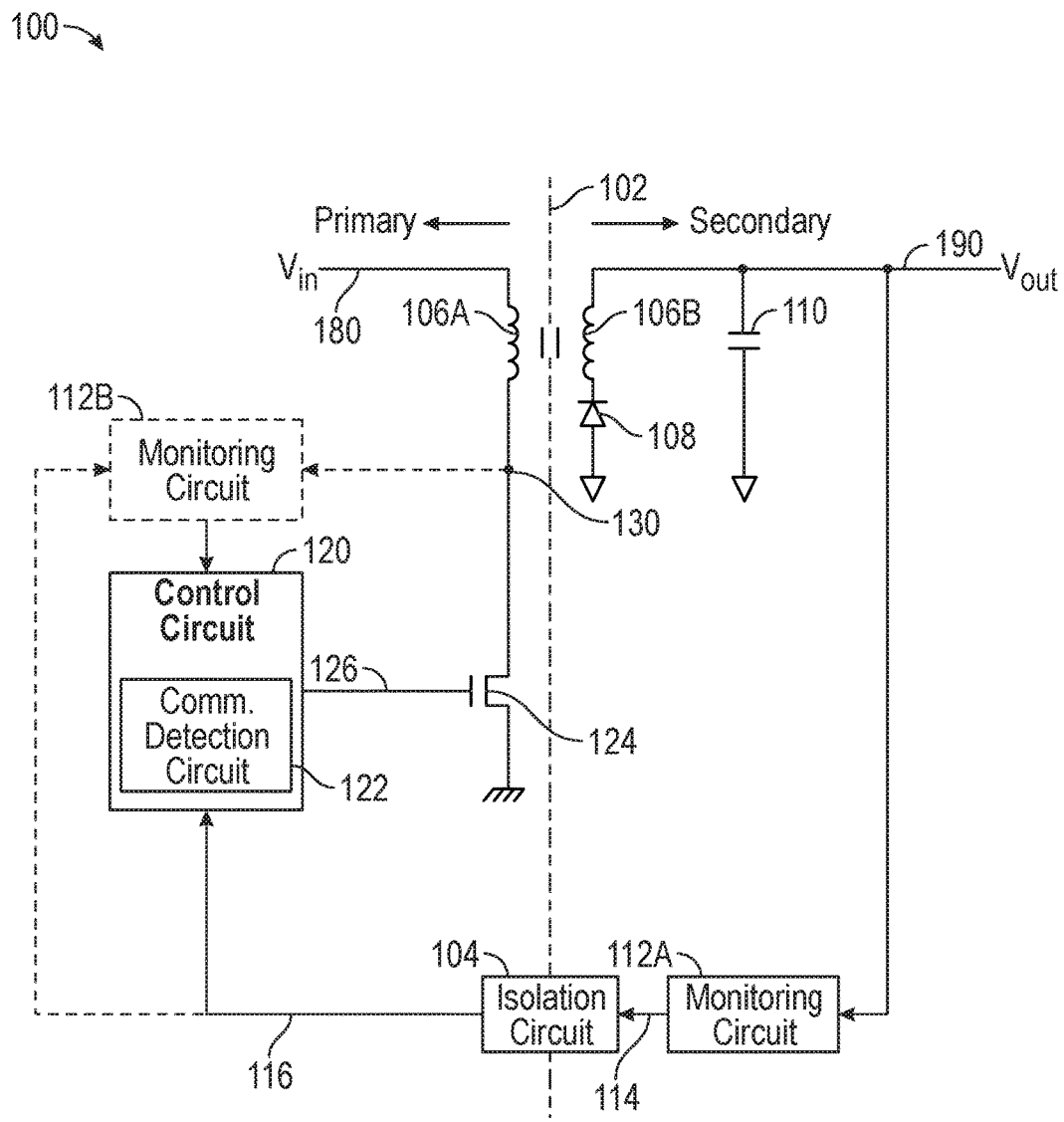
FIG. 1 illustrates generally an example comprising a flyback power conversion circuit including an isolation barrier comprising at least one monitoring circuit, and an isolation circuit to provide transmission of information, such as from the monitoring circuit, across the isolation barrier.

In flyback conversion circuits, information about a state of the output of the converter is generally provided across an isolation barrier. Such information is used to control the flyback conversion circuit, such as by controlling at least one switch on a primary side of a transformer or coupled inductor circuit. A feedback loop can thereby be formed, such as traversing the isolation barrier. But, the present inventor has recognized that a problem exists when information from across the isolation barrier is absent. The feedback loop may be open such as during a startup phase of operation before output voltage information or other information can be sent back across the isolation barrier, or the feedback loop may be broken due to a fault (e.g., a physical failure). In such scenarios when the feedback is absent or the loop is broken, there is a risk that an output node of the converter can be driven to an unacceptable or even an uncontrolled high voltage. In some applications, more expensive, larger, less efficient, or less accurate converter topologies or regulation schemes are used to avoid a risk of such unwanted high-voltage excursions.

According to various techniques and circuits described herein, the present inventor has developed solutions to inhibit or suppress such high-voltage excursions. Generally, the approaches described herein can detect whether information being transmitted across the isolation barrier is consistent with other information sources. If information indicative of an output voltage indicates a fault, other operational modes can be selected. For example, a regulation mode can be used during startup or during a fault where a switching node on the primary or input side of the flyback circuit is monitored. Over-voltage or other monitoring (e.g., over-current monitoring, or data integrity monitoring of digitally-encoded information) can be performed on at least one of the primary or second sides of the conversion circuit, or both, and redundant monitoring circuits can be included such as having differing physical monitoring nodes and pathways, such as to provide enhanced capability to detect potential faults.

In the presence of a detected fault, an operational mode of the flyback conversion circuit can be selected, such as to one or more of (a) initiate a restart of the conversion circuit, (b) shutdown the conversion circuit, (c) generate a flag or other signal indicative of a fault, (d) transition to a different regulation scheme (e.g., using an open-loop regulation scheme based on a duty-cycle of the primary-side switch, or a primary-side-only regulation scheme), or (e) limit further ramping of voltage at a specified node such as switching node on the primary side of the regulator circuit, as illustrative examples. In this manner, the output voltage of the flyback conversion circuit can be constrained and a potentially damaging overvoltage condition at the output of the flyback conversion circuit can be suppressed or inhibited.

FIG. 1 illustrates generally an example comprising a flyback power conversion circuit 100 including an isolation barrier 102. The isolation barrier generally defines two (or more) regions that are conductively isolated from each other. In the conversion circuit 100 of FIG. 1, a first inductance 106A can be included as a part of a coupled inductor or flyback transformer circuit, such as defining a primary side of the circuit 100, and a second inductance 106B can be included, such as defining a secondary side of the circuit 100. An input voltage node 180 can receive an input voltage, $V_{IN}$, such as a direct-current (DC) voltage. A primary side switch 124, such as a single transistor or transistor circuit can be used to selectively establish or interrupt a current through the first inductance 106A, using a switch control output 126 of a control circuit 120.

The circuit 100 can include at least one monitoring circuit, such as a first monitoring circuit 112A located on a secondary side of the conversion circuit 100 or second monitoring circuit 112B located on a primary side of the conversion circuit 100. The locations of the monitoring circuit 112A and 112B are illustrative, and such circuits can be partitioned to include portions on both the primary side and secondary sides of the flyback circuit, such as coupled through an isolation circuit 104. According to an illustrative example, the isolation circuit 104 can include an integrated magnetically-coupled isolation circuit, or an optically-coupled isolation circuit. Information transmitted across the isolation barrier 102 can include analog or digital information. For example, digitally-encoded information can be provided to an input 114 optical transmitter or input of the isolation circuit, and a corresponding output signal can be generated at the output 116 of the isolation circuit without conductive coupling between the input 114 and output 116. Such information can be provided to the control circuit 120 or other circuitry, such as the second monitoring circuit 112B.

During a switching cycle the first inductance 106A can be energized (e.g., "magnetized") under the control of the control circuit 120 using the switch 124. When the switch 124 is opened (e.g., set to a high-impedance state), the energy in the first inductance 106A is coupled to the second inductance 106B. A rectifier 108 (such as a shunt catch diode as shown, or a series diode as shown in other examples) can block current flow in one direction, and permit current flow in an opposite, second direction, such as allowing current during a discharge or "demagnetizing" phase of the switching cycle. An energy storage device such as a reservoir capacitor 110 can store energy coupled from the second inductance 106B during the dump cycle, and a voltage at an output node 190 can be established at a desired output voltage, $V_{OUT}$, such as having a specified (e.g., programmed) value greater or lesser in magnitude than the input voltage, $V_{IN}$.

Information indicative of the output voltage, $V_{OUT}$, can be obtained by the monitoring circuit, and transmitted across the isolation barrier 102 using the isolation circuit 104. For example, digitally-encoded information indicative of $V_{OUT}$ (e.g., a $V_{OUT}$ value or a value derived from $V_{OUT}$ such as an integrated feedback signal indicative of an error between $V_{OUT}$ and a reference value) can be provided by the monitoring circuit 112A. The control circuit 120 can include a communication detection circuit 122, such as to detect presence of information or to determine whether valid information is being received from across the isolation barrier 102 through the isolation circuit 104. In response to an indication as to whether valid information has been received or whether such information is consistent with one or more other sources of information about output voltage, the control circuit 120 can select an operational mode of the flyback conversion circuit 100. For example, the control circuit 120 can select an operational mode of the flyback conversion circuit 100 in response to other information, such as in response to a value indicative of one or more of a switching node 130 voltage on the primary side of the flyback conversion circuit (e.g., providing an indirect measurement of output voltage), an overvoltage indication from one or more of the first monitoring circuit 112A or the second monitoring circuit 112B, or in response to other information.

As an illustrative example, during a startup mode of operation, the flyback conversion circuit 100 can operate either in an open-loop fashion, such as controlling a switch 124 duty cycle without reference to information indicative of the output voltage, $V_{OUT}$ or in a closed-loop fashion. For example, closed-loop operation can be used to control a parameter such as a primary-side switch 124 duty cycle in response to output voltage information monitored using the switching node 130 during the flyback phase of the switching cycle. During the flyback phase (e.g., a portion of the switching cycle after the switch 124 is turned off), the switching node 130 voltage acquires a value approximating the input voltage $V_{IN}$ plus the output voltage $V_{OUT}$, plus other contributions from elements such as the IR drop associated with parasitic resistance, and a voltage drop across the rectifier 108. In this manner, the switching node 130 voltage can be used to indirectly monitor the output voltage, $V_{OUT}$. In another illustrative example, the primary-side switch 124 duty cycle can be controlled such as using information about one or more of a peak or an average current through the primary-side switch 124, such as combined with information indicative of the output voltage information monitored using the switching node 130 during the flyback phase of the switching cycle (current-mode control).

Regardless of whether open-loop operation or primary-side closed loop operation is used, such as during startup, the flyback conversion circuit 100 can be configured to transition to a closed-loop control scheme when information indicative of the output voltage is received across the isolation barrier 102 through the isolation circuit 104. Generally, output voltage regulation circuitry and the circuitry driving the isolation circuit 104 are powered from an output side 106B of the conversion circuit 100. Accordingly, in such an output-side powered configuration, such regulation and drive circuitry do not operate below a specified minimum output voltage from the output side 106B. In an example, the flyback conversion circuit 100 can use information from the primary side of the conversion circuit 100 as a cross-check to determine whether a normal startup or transient recovery is occurring. For example, if the conversion circuit detects that an indirect proxy for the output voltage, such as voltage at the switching node 130, exceeds a level at which the output voltage regulation circuitry and isolation circuit 104 should have powered up and begun communication across the isolation barrier 102, and if no such communication is detected, then the flyback conversion circuit 100 can declare a fault, triggering one or more responses such as (a) initiation of a restart of the conversion circuit 100, (b) shutdown of the conversion circuit 100, (c) generation a flag or other signal indicative of a fault, (d) transition to a different regulation scheme, or (e) limiting of further ramping of voltage at a specified node such as switching node 130 on the primary side of the conversion circuit 100, as illustrative examples. Similarly, the flyback conversion circuit 100 can monitor at least two sources of information indicative of output voltage, such as provided by the first and second monitoring circuits 112A and 112B. If the two monitoring circuits give inconsistent information (e.g., one circuit indicates a fault or an overvoltage condition), or if either monitoring circuit indicates a fault, an operational mode of the flyback circuit can be changed.

After startup, if at any time communication across the isolation barrier 102 is corrupted or lost, the conversion circuit 100 can detect such corruption or loss of communication (such as using the communication detection circuit 122), and the conversion circuit 100 can respond in a specified manner such as mentioned above. For example, the flyback conversion circuit 100 can switch modes to primary-side closed-loop control or can continue to monitor a primary-side node such as the switching node 130. The flyback conversion circuit can monitor the switching node 130 to determine whether the switching node has met or exceed a target voltage corresponding to an expected target output voltage, $V_{OUT}$. If the switching node 130 exceeds the target voltage value, or is outside a specified window, an overvoltage or other fault condition can be declared based on such primary-side monitoring. A separate over-voltage detection scheme can be used on the secondary side, such as using the monitoring circuit 112A to detect such an overvoltage or other fault condition, and the isolation circuit 104 to communicate information indicative of one or more of the output voltage, an overvoltage condition, or other fault information, across the isolation barrier 102.

Overvoltage detection or other fault detection circuitry can incorporate redundancy, such as having physically separate monitoring paths that can be independent of a control loop feedback path. In an example, indications from redundant voltage monitoring channels can be compared, and the conversion circuit 100 can declare a fault if disagreement exists between the redundant monitoring channels, or if a single monitoring channel indicates an overvoltage or other condition such as communication loss or corruption. In an example, corruption of communication across the isolation barrier 102 can be detected as evidenced by such disagreement. As an illustration, communication can be interrupted across the isolation barrier 102 when any one of various redundant monitoring circuits indicates an overvoltage or other fault condition, such as described below and in relation to other examples herein.

Figure 2:
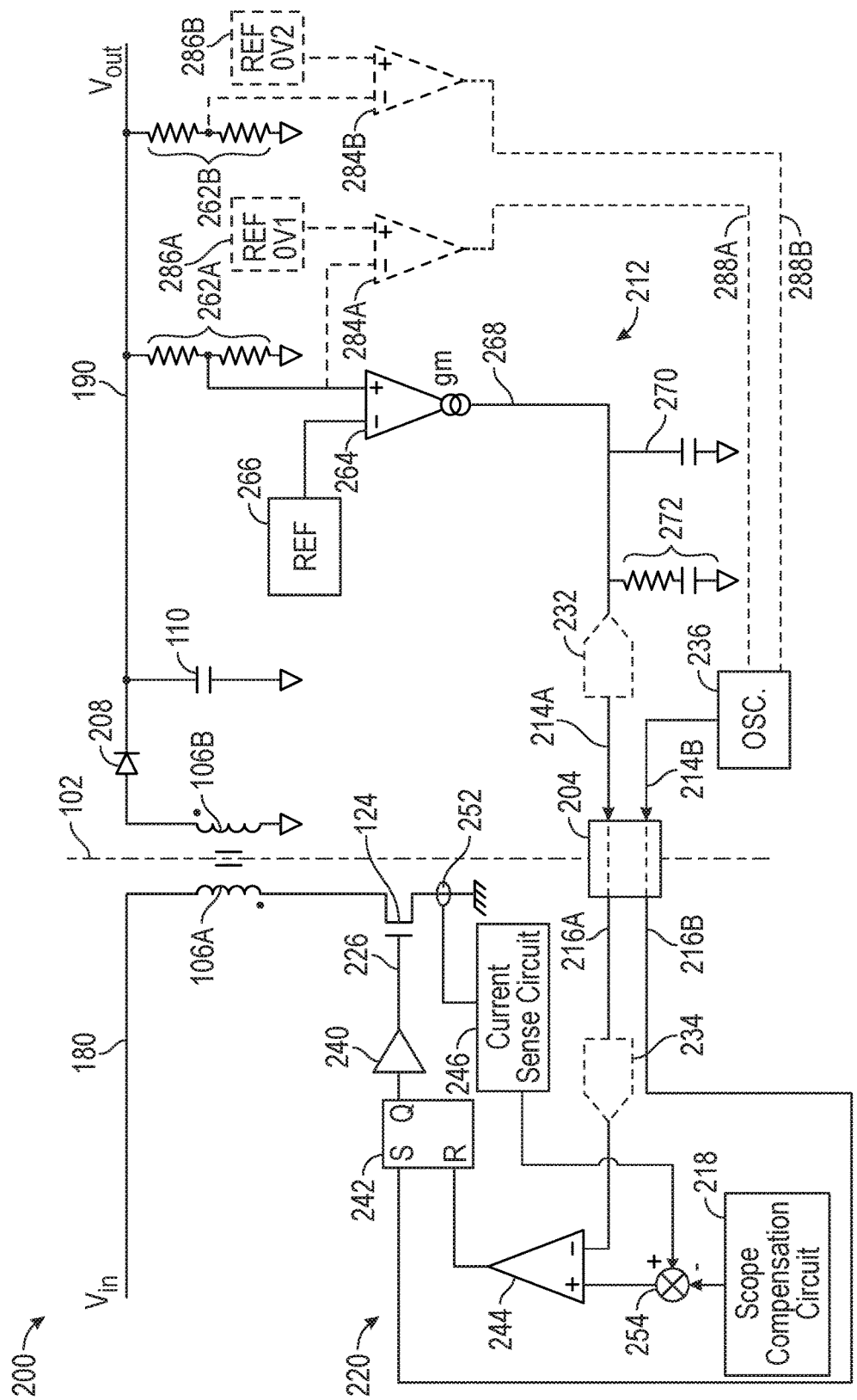
FIG. 2 illustrates generally an illustrative example comprising a flyback power conversion circuit including an isolated current-mode feedback scheme.

FIG. 2 illustrates generally an illustrative example comprising a flyback power conversion circuit 200 including an isolated closed-loop feedback scheme. As an illustrative example, two or more redundant output voltage monitoring circuits can optionally be included, such as located on the secondary side of the conversion circuit, and such a configuration is shown illustratively in FIG. 2, including comparator circuits 284A and 284B coupled to overvoltage reference circuits 286A and 286B, respectively. If either of the redundant monitoring circuits comprising the reference circuits 286A and 286B, respectively, indicates an output voltage 190 excursion beyond the threshold established by the reference circuits 286A and 286B, communication across the isolation barrier can be interrupted, or otherwise modified. For example, the outputs 288A and 288B of the comparator circuits 284A and 284B can be routed to respective enable inputs of an oscillator 236. The oscillator can be disabled when either of the outputs indicates an overvoltage condition, for example, interrupting communication across the isolation barrier 102. Other faults, such as a broken signal chain or external interference could similar corrupt or interrupt communication across the isolation barrier. From the perspective of the primary side of the conversion circuit 200, recovery or response to interrupted or corrupted communication can include triggering one or more responses such as (a) initiation of a restart of the conversion circuit 200, (b) shutdown of the conversion circuit 200, (c) generation a flag or other signal indicative of a fault, (d) transition to a different regulation scheme (e.g., using an open-loop regulation scheme based on a duty-cycle of the primary-side switch, or a primary-side-only regulation scheme), or (e) limiting of further ramping of voltage at a specified node such as switching node on the primary side of the conversion circuit, as illustrative examples. In an illustrative example, the recovery or the response to interrupted or corrupted communication can vary depending on the nature of the detected fault, such as to provide different responses for total loss of communication versus corrupted communication across the isolation barrier 102, for example.

An output-side monitoring circuit 212 can be included to provide a feedback signal for control of the conversion circuit 200, along with an input-side monitoring circuit 220. As in the example of FIG. 1, in FIG. 2, an isolation barrier 102 generally defines two (or more) regions that are conductively isolated from each other, and the power conversion circuit 200 can include a first inductance 106A, a second inductance 106B, an input voltage node 180 to receive an input voltage, $V_{IN}$, such as a direct-current (DC) voltage, and a primary side switch 124. A rectifier 208 and capacitor 110 can be included, such as arranged to provide an output node 190, $V_{OUT}$.

A feedback arrangement can be used, such as can include a reference circuit 266 coupled to a transconductance device (e.g., a transconductance amplifier 264) A representation of $V_{OUT}$ can be coupled to an input of the transconductance amplifier 264, such as using a divider circuit 262. An output of the transconductance amplifier 268 can provide information indicative of an error between the $V_{OUT}$ representation and the reference, and the error can be integrated such as using a capacitor 270. Other components can be included, such as a compensation network 272. In an example, a digitized representation of the integrated error signal can be provided at 214A, such as using an analog-to-digital converter circuit 232. An isolation circuit 204 can couple the digitized integrated error signal across the isolation barrier 102 to provide a primary-side digital signal 216A, which can be converted back to the analog domain using a digital-to-analog converter circuit 234. For example, the ADC 232 can include a 1-bit ADC configured to encode the voltage stored using the capacitor 270 into a corresponding pulse width representative of the voltage value. The DAC 234 can decode the pulse width to a corresponding voltage value to provide an input for the primary-side comparator circuit 244. An edge identification scheme can be used in the digital encoding feedback path, such as providing two narrow pulses to indicate the beginning (e.g., rising edge) of the pulse-width encoded voltage feedback signal, and a single additional narrow pulse to denote the falling edge.

Other monitoring or control circuitry can be included as a portion of the primary or secondary sides, or using a combination of primary-located and secondary-located circuits. For example, in FIG. 2, other information can be combined with error signal, such as using a comparator circuit 244, to control a latch 242. The latch can be coupled to a gate driver circuit 240, such as to provide a drive signal 226 to control the switch 124. As an illustrative example, a current can be sensed at 252 using a current sensing circuit 246 arranged to monitor a primary-side current through the first inductance 106A. An output of the current sensing circuit, indicative of the primary-side current can be provided to the comparator circuit 244. Other control signals can be provided and used, such as for slope compensation as shown in relation to the slope compensation circuit 218.

The conversion circuit 200 can include other features to provide fault recovery or otherwise suppress high-voltage excursions at the output. For example, during normal running operation, an oscillator circuit 236 can be powered by the secondary side of the conversion circuit 200, and an oscillator output 214B can be coupled back to the primary side through the isolation circuit 204 (e.g., either magnetically or optically, for example) to provide a primary-side oscillator signal 216B. The isolation circuit 204 can have physically separate hardware channels, or the oscillator signal can be embedded in a serial digital signal transmitted through the isolation circuit 204 using a signal channel, and a corresponding clock can be recovered on the primary side. In an example, respective overvoltage trip points established by the reference circuits 286A and 286B can be similar, or the values can be different. For example, the first reference circuit 286A can establish an overvoltage detection threshold marginally above a nominal target voltage established by the feedback reference circuit 266. The second reference circuit 286B can establish another overvoltage detection threshold having a value more significantly beyond the nominal target voltage, such as to provide redundant detection of a severe voltage excursion at $V_{OUT}$.

The primary-side oscillator signal 216B can be used to establish power conversion switching cycles, such as being coupled to an input of the latch 242, with the on-time of the switch 124 being determined at least in part using the feedback coupled to another input of the latch as mentioned above. A failure of the oscillator 236, or isolation circuit 204 can suppress switching cycles, limiting an unwanted excursion in the output voltage, $V_{OUT}$. As mentioned in relation to other examples, other circuitry can be used to perform overvoltage or fault monitoring, such as to sense one or more of a primary-side or secondary-side overvoltage condition, and the conversion circuit 200 can be configured to respond accordingly by either transitioning to a different regulation mode, or shutting down, as illustrative examples. Separate startup control or monitoring circuitry can be used, and the scheme shown in FIG. 2 can be used after startup, during normal running operation. For example, an overvoltage sensing scheme such as shown in FIG. 3 could be combined with other examples described in this document.

Figure 3:
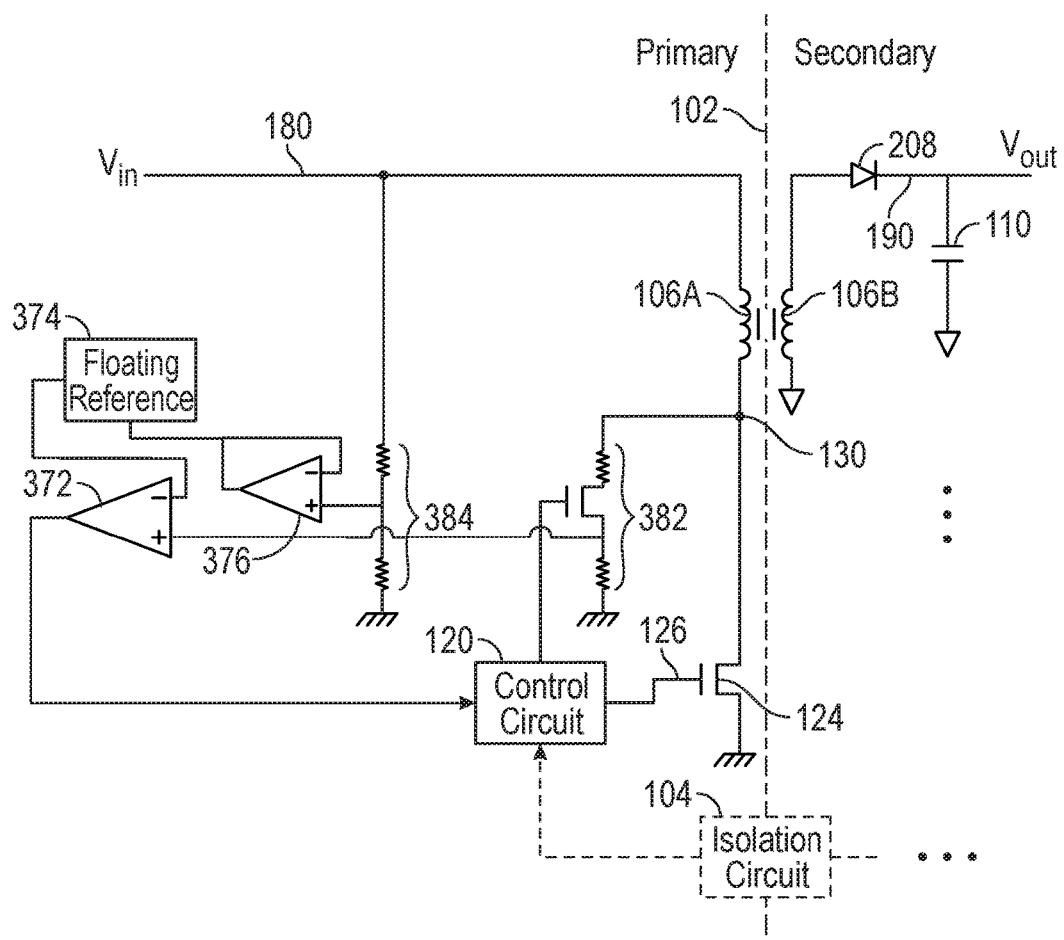
FIG. 3 illustrates generally an illustrative example comprising a flyback power conversion circuit including a primary-side monitoring circuit, such as to provide overvoltage protection using information obtained from a primary-side portion of the flyback power conversion circuit.

FIG. 3 illustrates generally an illustrative example comprising a flyback power conversion circuit including a primary-side monitoring circuit, such as to provide overvoltage protection using information obtained from a primary-side portion of the flyback power conversion circuit, to prevent a damaging overvoltage condition on the primary side such as at the switching node 130, while also protecting secondary side elements such as at the rectifier 208 input node, capacitor 110, and output node 190, $V_{OUT}$. As mentioned in relation to other examples, the rectifier 208 can be located in one or more positions, such as in series with $V_{OUT}$ as shown, or between an output inductance 106B terminal and ground. Active or passive rectification can be used.

In the example of FIG. 3, a value representative of an input node 180, $V_{IN}$, can be provided to a unity-gain buffer 376, such as for use in combination with a reference 374 that can be provided to a comparator circuit 372. The reference 374 can be a floating reference, such as providing a specified voltage offset. For example, the value representative of $V_{IN}$ can be provided through a voltage divider 384, to the comparator 372, with the specified offset applied. A value from an intermediate node such as switching node 130 can also be provided to another input of the comparator, such as using a second divider 382. The second divider can include a switch, such as to suppress unwanted leakage when the divider 382 is not in use. For example, during a portion of the flyback phase of operation where the switch 124 is turned off, the switch in the divider circuit 382 can be turned on to allow feedback to occur from the switching node 130. The switch 382 can be turned off at other times.

An output of the comparator circuit 372 can be provided to a control circuit 120. If the information indicative of the value of the switching node 130 indicates a voltage excursion beyond a specified threshold or window, such as a threshold established by the reference 374 at the comparator circuit 372, then an output of the comparator can signal to the control circuit 120 that an overvoltage condition is occurring. During the flyback phase of operation, the voltage at the switching node 130 will approximate $V_{IN}+V_{OUT}$. The voltage at the non-inverting input to the comparator circuit 372 will be approximately $[V_{IN}+V_{OUT}]$ multiplied by the divider circuit 382 gain. Similarly, the output of the divider circuit 384 will be $V_{IN}$ multiplied by the divider circuit 384 gain. If the gains of the divider circuits 382 and 384 are assigned the same value, the offset voltage between the output of the divider circuit 384 and the inverting input of the comparator 372 can be established as a target output voltage multiplied by the gain of the divider circuit 384. In this manner, the comparator circuit 372 will toggle during the flyback phase when $V_{OUT}$ is approximately equal to the target output voltage.

As mentioned in relation to other examples herein, the conversion circuit can respond to the overvoltage condition in a variety of manners. A topology similar to the configuration shown in FIG. 3 could instead use a transconductance amplifier and a compensation circuit, instead of the comparator circuit 372. In addition, or instead, a topology similar to FIG. 3 can be used to provide primary-side closed-loop regulation, such as using the switching node 130 to provide feedback indicative of the output voltage, $V_{OUT}$, such as when direct feedback indicative of $V_{OUT}$ is not available through an isolation circuit 104. As mentioned in relation to other examples herein, an overvoltage detection scheme as shown in FIG. 3 can be included in a circuit having other overvoltage or fault detection capabilities. For example, information provided by the scheme shown in FIG. 3 can be observed by the control circuit in comparison to feedback provided through the isolation circuit 104, such as providing a technique for detecting whether seemingly valid but corrupted information is being provided through the feedback path. If the output voltage estimated by monitoring the switching node 130 is inconsistent with an output voltage value or fault indication transmitted through the isolation circuit 104, the conversion circuit can declare a fault and can respond either by shutting down or by otherwise changing operational modes.

Figure 4:
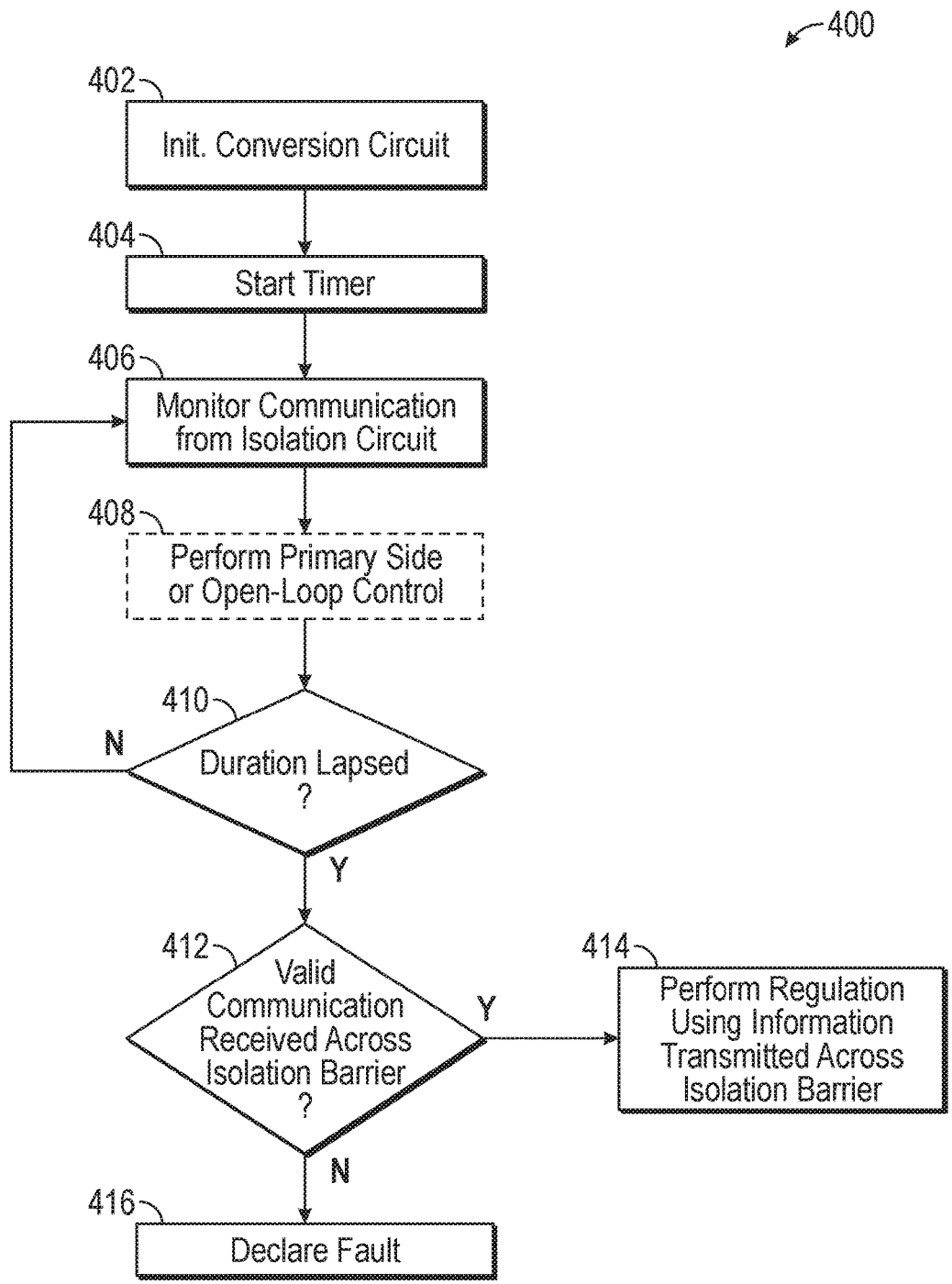
FIG. 4 illustrates generally a technique, such as a method, that can include initializing a flyback power conversion circuit and monitoring for one or more fault conditions during startup.

FIG. 4 illustrates generally a technique, such as a method, that can include initializing a flyback power conversion circuit at 402 and monitoring for one or more fault conditions during startup. For example, at 404, a timer can be initiated. At 406, communication from an isolation circuit can be monitored. Such monitoring can include determining whether any communication is occurring (e.g., sensing a presence of information being transmitted across the isolation barrier) or whether the communicated information is valid (such as within a specified range of expected values). Such monitoring can include performing a consistency check between one or more other sources of feedback, such as provided from one or more redundant sensing pathways. At 408, for example, and as mentioned above, a primary-side sensing scheme can be used in addition or instead of using information transmitted across an isolation barrier, particularly during startup, or the conversion circuit can be operated in an open-loop fashion. At 410, if a specified duration has lapsed as indicated by the timer initiated at 404, then at 412, a determination can be made as to whether valid information has been received across the isolation barrier. If valid information has been received, then, at 414, regulation can be performed at least in part (or entirely) using information provided across the isolation barrier (e.g., closed-loop regulation using feedback provided from a secondary side of the conversion circuit). Various techniques can be used to transition between open-loop or primary-side-only regulation, such as to avoid unwanted output transients. For example, a hybrid control scheme can be used, either temporarily or on an ongoing basis at runtime after startup. Such a hybrid control scheme can gradually shift between primary-side-only or open-loop regulation to closed loop regulation, such as using a linear ramp versus time. In another example, a slew rate limiting scheme can be used, having similar slew rate or ramp rate limitations for both startup and normal operation.

If no valid communication has occurred at 412 or if an inconsistency between information received through the isolation barrier has occurred when compared against information from another source (such as obtained from a separate monitoring pathway), then at 416, a fault can be declared. A response to the fault can include one or more of a) initiation of a restart of the conversion circuit, (b) shutdown of the conversion circuit, (c) generation a flag or other signal indicative of a fault, (d) transition to a different regulation scheme (e.g., using an open-loop regulation scheme based on a duty-cycle of the primary-side switch, or a primary-side-only regulation scheme), or (e) limiting of further ramping of voltage at a specified node such as switching node on the primary side of the conversion circuit, as illustrative examples.

Figure 5:
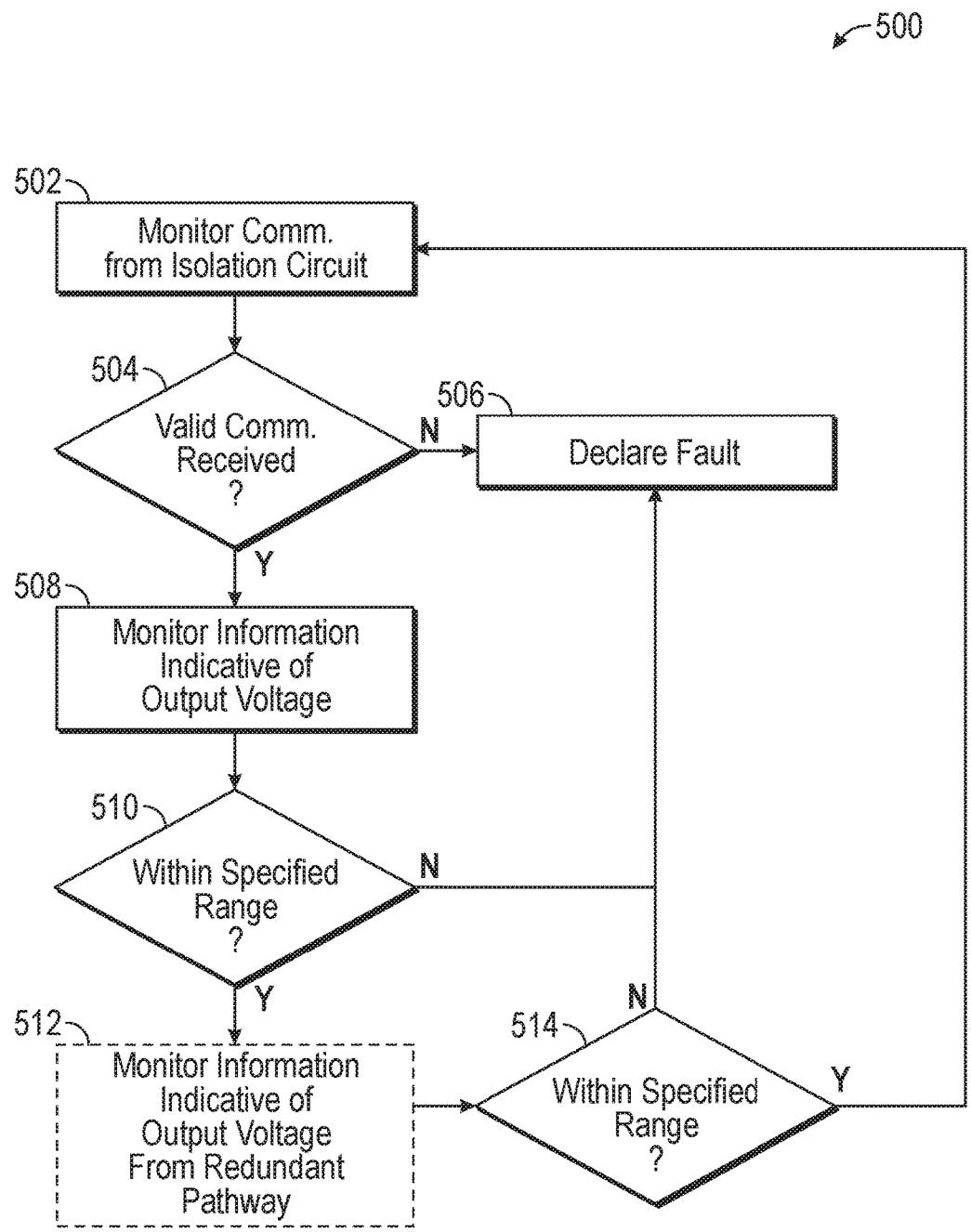
FIG. 5 illustrates generally a technique, such as a method, that can include monitoring for one or more fault conditions, such as during or after an initial startup duration.

FIG. 5 illustrates generally a technique, such as a method, that can include monitoring for one or more fault conditions, such as during or after an initial startup duration. At 502, communication provided by an isolation circuit can be monitored. If, at 504, a valid communication is not received, then a fault can be declared at 506. If, at 504, valid communication is being received, then information indicative of an output voltage can be monitored at 508. If at 510, the voltage is within a specified range, then other information can be monitored at 512, such as information indicative of the output voltage obtained via a redundant pathway. If either of monitored indications of output voltage or outside the specified range as determined at 508 and 514, then at 506, a fault can be declared at 506.

Various Notes

Each of the non-limiting aspects described herein can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of operating a flyback power conversion circuit, the method comprising:

using a control circuit, selectively establishing and interrupting a current through a first inductance to store energy during a switching cycle;

transferring a portion of the energy from a second inductance to a storage device to provide an output voltage, the second inductance magnetically coupled to the first inductance, using the control circuit, monitoring information from at least two sources of information indicative of the output voltage, including monitoring information transmitted across an isolation barrier, the isolation barrier configured to inhibit conductive coupling between the circuits comprising the first and second inductances, the monitoring including:

establishing an initial startup duration;

detecting a validity of information indicative of the output voltage being transmitted across the isolation barrier during the initial startup duration, the detecting including determining whether the monitored information from the two sources is consistent; and declaring a fault condition if valid information is not detected within the initial startup duration.

2. The method of claim 1, wherein the monitoring at least two sources comprises monitoring a node on the primary side of the flyback conversion circuit to indirectly obtain the information indicative of the output voltage and monitoring a node on the secondary side of the flyback conversion circuit to directly obtain the information indicative of the output voltage.

3. The method of claim 1, wherein the control circuit selects a fault-responsive mode of operation of the flyback power conversion circuit in response to the declaring the fault condition.

4. The method of claim 3, wherein the fault-responsive mode of operation includes at least one of shutting down the flyback power conversion circuit, restarting the flyback power conversion circuit, or selecting a regulation mode using information from an input side of the flyback power conversion circuit comprising the first inductance.

5. The method of claim 1, wherein monitoring the information indicative of the output voltage comprises comparing a value of the information indicative of the output voltage against a specified threshold or determining if the value of the information indicative of the output voltage is within a specified window of values.

6. The method of claim 5, wherein monitoring the information indicative of the output voltage includes monitoring at least two channels having different circuit paths to an output of the flyback power conversion circuit.

7. The method of claim 6, wherein detecting whether valid information indicative of the output voltage is being transmitted includes receiving multiplexed information indicative of values from the at least two channels.

8. The method of claim 1, comprising monitoring information indicative of an input voltage at a node included in a circuit comprising the first inductance; and at least one of detecting whether a value of the information indicative of the input voltage exceeds a specified threshold or determining if the value of the information indicative of the input voltage is within a specified window of values; and in response, selecting the operating mode of the flyback power conversion circuit using the control circuit.

9. The method of claim 1, wherein the information indicative of the output voltage comprises an integrated representation of an error between a representation of the output voltage and a specified reference.

10. The method of claim 1, wherein the isolation barrier is established using an isolation circuit comprising a transmitter and receiver, and wherein the method includes transmitting a digital representation of an information signal across the isolation barrier using the transmitter, the digital representation aggregating information from at least two channels having different circuit paths to an output of the flyback power conversion circuit.

11. A flyback power conversion circuit configured to provide a regulated output voltage, the flyback power conversion circuit comprising:
an input voltage node configured to receive a direct current (DC) input voltage;
a control circuit;
a primary-side switch coupled to the control circuit and configured to selectively establish and interrupt a current through a first inductance in response to a switch control signal provided by the control circuit;
a feedback circuit, the feedback circuit configured to provide information across an isolation barrier to the control circuit using an isolation circuit, the information indicative of an output voltage, the isolation barrier inhibiting conductive coupling between the first inductance and a magnetically-coupled second inductance, the first inductance included as a portion of primary-side circuit, and the magnetically-coupled second inductance included as a portion of a secondary-side circuit, the isolation circuit comprising a transmitter and receiver, the transmitter configured to transmit a digital representation of an information signal aggregating information indicative of the output voltage from at least two channels having different circuit paths to an output of the flyback power conversion circuit;
wherein the output voltage is established at the secondary-side circuit; and
wherein the control circuit is configured to monitor information from the at least two channels, and, in response, to select an operating mode of the flyback power conversion circuit using the control circuit.

12. The flyback power conversion circuit of claim 11, comprising a first monitoring circuit configured to monitor a node on the primary side of the flyback conversion circuit to indirectly obtain the information indicative of the output voltage; and
a second monitoring circuit configured to monitor a node on the secondary side of the flyback conversion circuit to directly obtain the information indicative of the output voltage.

13. The flyback power conversion circuit of claim 11, comprising a threshold comparator, the threshold comparator including:
a first input coupled to a reference;
a second input configured to receive a representation of the output voltage; and
an output coupled to the isolation circuit to provide the information indicative of the output voltage including whether the representation of the output voltage exceeds a threshold defined by the reference.

14. The flyback power conversion circuit of claim 13, comprising an analog-to-digital converter configured to receive the information indicative of the output voltage and configured to provide a digital representation of a value of the information indicative of the output voltage.

15. The flyback power conversion circuit of claim 13, wherein the threshold comparator comprises a differential amplifier included as a portion of a feedback circuit, the feedback circuit configured to integrate an error signal, the error signal defined by a difference between the representation of the output voltage and the reference.

16. The flyback power conversion circuit of claim 11, wherein each of the at least two channels are configured to independently monitor the information indicative of the output voltage for an over-voltage condition.

17. The flyback power conversion circuit of claim 11, wherein the control circuit selects a fault-responsive mode of operation of the flyback power conversion circuit in response to the declaring the fault condition; and
wherein the fault-responsive mode of operation includes at least one of shutting down the flyback power conversion circuit, restarting the flyback power conversion circuit, or selecting a regulation mode using information from an input side of the flyback power conversion circuit comprising the first inductance.

18. An integrated flyback power conversion control circuit comprising an integrated circuit package including:
a control circuit;
a primary-side switch driver circuit coupled to the control circuit and configured to selectively establish and interrupt a current through a first inductance in response to the control circuit; and
a feedback circuit, the feedback circuit configured to provide information across an isolation barrier to the control circuit using an isolation circuit, the information indicative of an output voltage, the isolation barrier inhibiting conductive coupling between the first inductance and a magnetically-coupled second inductance, the first inductance included as a portion of primary-side circuit, and the magnetically-coupled second inductance included as a portion of a secondary-side circuit;
wherein the output voltage is established at the secondary-side circuit; and
wherein the control circuit is configured to monitor information from at least two sources indicative of the output voltage, the monitoring including:
establishing an initial startup duration;
detecting a validity of information indicative of the output voltage being transmitted across the isolation barrier during the initial startup duration, the detecting including determining whether the monitored information from the two sources is consistent; and
declaring a fault condition if valid information is not detected within the initial startup duration.

19. The integrated flyback power conversion circuit of claim 18, comprising:
a first monitoring circuit configured to monitor a node on the primary side of the flyback conversion circuit to indirectly obtain the information indicative of the output voltage; and
a second monitoring circuit configured to monitor a node on the secondary side of the flyback conversion circuit to directly obtain the information indicative of the output voltage.

20. The integrated flyback power conversion circuit of claim 18, wherein the isolation circuit comprises a transmitter and receiver, the transmitter configured to transmit a digital representation of an information signal aggregating information from at least two channels having different circuit paths to an output of the flyback power conversion circuit.

* * * * *

UNITED STATES PATENT AND TRADEMARK OFFICE
CERTIFICATE OF CORRECTION

PATENT NO. : 10,355,602 B2
APPLICATION NO. : 15/408948
DATED : July 16, 2019
INVENTOR(S) : Gavin Galloway Page 1 of 1

It is certified that error appears in the above-identified patent and that said Letters Patent is hereby corrected as shown below:

In the Drawings

Sheet 2 of 5, Fig. 2, reference numeral 218, Lines 1-3, delete "Scope Compensation Circuit" and insert --Slope Compensation Circuit-- therefor In the Claims Column 14, Line 29, Claim 18, delete "harrier" and insert --barrier-- therefor Signed and Sealed this
Twenty-first Day of April, 2020

Andrei Iancu
*Director of the United States Patent and Trademark Office*